April 30, 1968  W. E. JENNINGS ETAL  3,380,220
PLASTIC BAG TREE PACKAGING
Filed Sept. 3, 1963
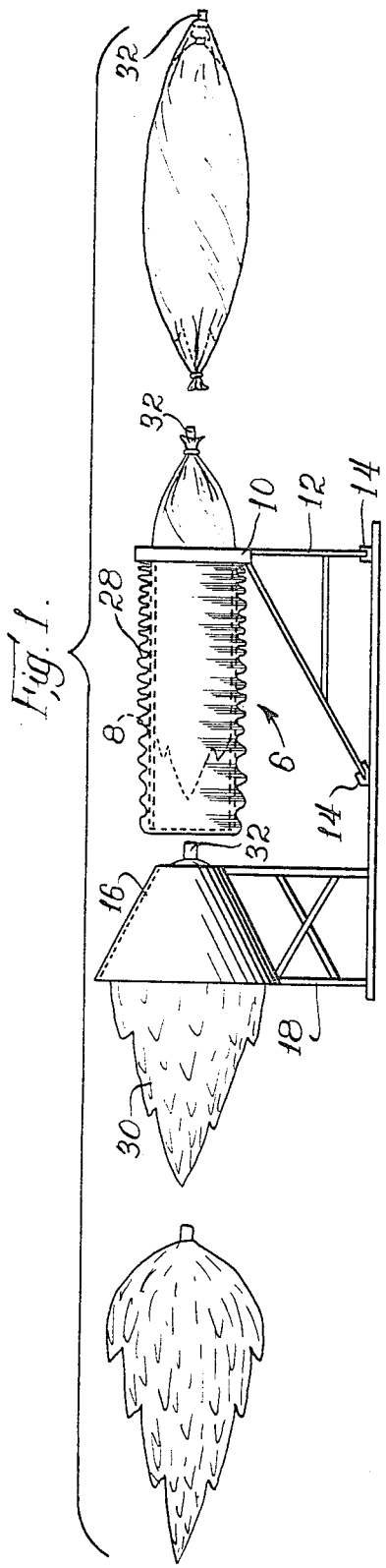
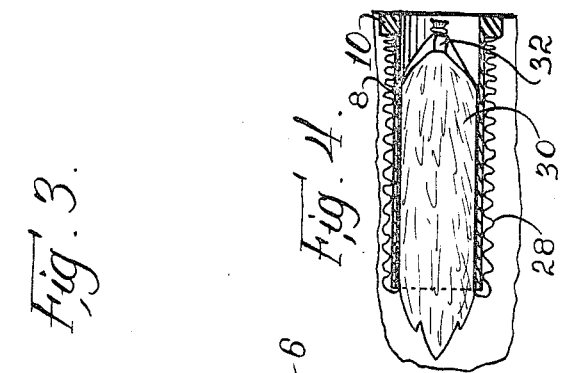
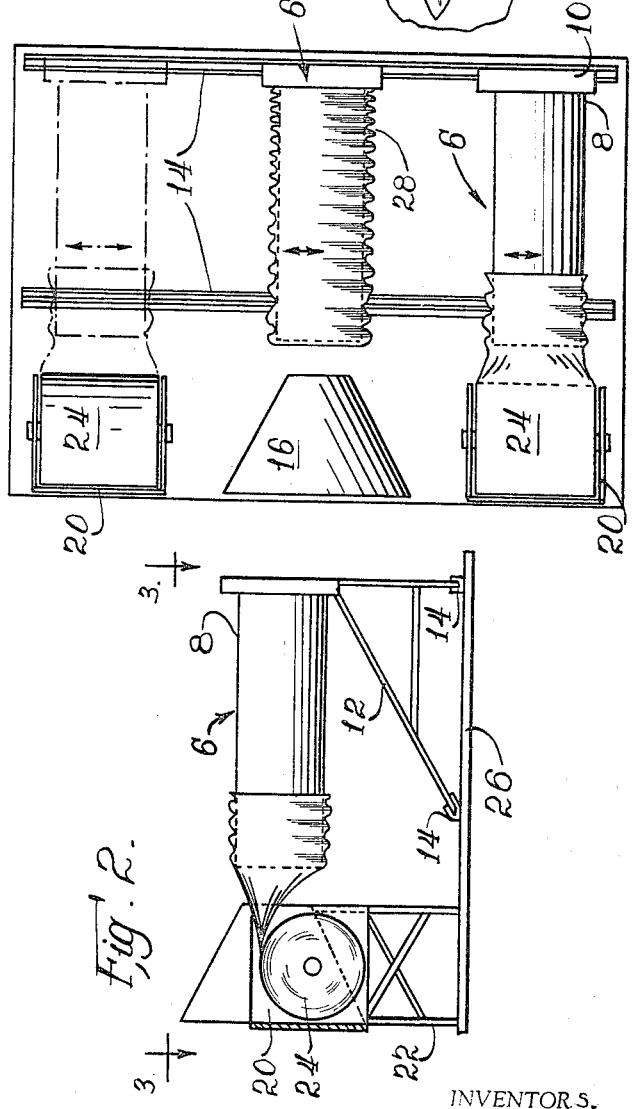
INVENTORS.
W. E. JENNINGS
S. E. WATSON
W H BOROUGH
Dominik, Rudy & Stein
ATT'YS

United States Patent Office 3,380,220
Patented Apr. 30, 1968

3,380,220
PLASTIC BAG TREE PACKAGING
Walter E. Jennings, Midland, Stewart E. Watson, Bay City, and William H. Borough, Midland, Mich., assignors to The Dow Chemical Company, Midland, Mich., a corporation of Delaware
Filed Sept. 3, 1963, Ser. No. 305,940
10 Claims. (Cl. 53—24)

ABSTRACT OF THE DISCLOSURE

Method and apparatus for packaging trees, especially Christmas trees, in a continuous process fashion wherein each tree is slipped through a funnel and then through a sleeve with a supply of tubular film thereon to invert the tube inside itself and to enclose the tree being packaged.

---

This invention relates to a method and apparatus for packaging trees, especially Christmas trees, in a plastic bag immediately after harvesting so as to preserve tree freshness for an extended period of time.

Harvesting of Christmas trees, more commonly those of the coniferous type, such as Scotch pine, is advantageously done as close to marketing time as possible to minimize moisture loss, a condition which is directly related to tree discoloration and needle loss. In northern climates where the weather is normally cold, or cool during harvesting and subsequent handling and marketing operations of such trees, the problem of tree dry-out is generally not too serious. However, when such trees are sent to warmer climates, as afforded by southern states, the problem of tree dry-out becomes serious and special precautions, such as refrigeration to reduce moisture loss, are often necessary, otherwise the trees become brittle, discolor, and lose their foliage, e.g. needles. In shipping such trees over long distances, the trees are often bundled, i.e., the branches are tied close to the tree trunk, and such bundling is done either on single trees, or groups of trees. Such practice lends itself to the use of a film covering, or wrapping on the bundle.

The inventive concept of the present disclosure relates to the enclosure of a bundled tree in a tube of breathing type, or perforated, plastic material which material would maintain the moisture content of the tree above a critical level, thus preserving the freshness of the tree after the tree was harvested and until it is used by the ultimate user. Such packaged trees will keep fresh in spite of warmer weather, hence can be shipped just about any place without deterioration. Certain trees, such as Scotch pine, which have been cut after the color has begun turning to yellow, will regain their green color under certain conditions, namely, sufficient moisture, warm temperature, and light. Accordingly, another advantage afforded by the invention is that late cut trees which had begun to turn yellow, could be packaged according to the principles of the invention, and be shipped to a warmer climate where they would regain their green color, after a certain amount of exposure to heat and light. This would not only avoid losses usual with late tree harvesting, but would extend the cutting season up until the first of December for trees destined for the southern market, or for indoor store sales. A further advantage associated with the invention is that such packaged trees will withstand much more abuse in handling without damage thereto.

A principal object of this invention is to provide a method and apparatus for packaging trees, so that the trees will be preserved in fresh condition for an extended period of time after harvesting.

A more specific object is to provide a method and apparatus for packaging coniferous trees so that they will remain green and in full foliage from the time of harvesting, until used by the ultimate user, without the need for special precautions, such as refrigeration.

Still another object is to provide a method and apparatus for packaging Christmas trees so that they may be shipped long distances and into warmer climates without discoloration or loss of foliage.

A further object of this invention is to provide a method and apparatus which will help restore the green color of late cut trees which have started to turn yellow.

Another object is to provide a bundled Christmas tree which will remain fresh for an extended period of time after harvesting, and which may be more conveniently handled and stored.

A further object is to provide a method and apparatus which would permit late harvesting of Christmas trees destined for the southern market.

Still another object is to provide a method and apparatus which will allow handling of trees with less damage and loss because of rough handling.

These and further objects and features of the invention will become more apparent from the following description and accompanying drawing wherein:

FIG. 1 is a schematic view illustrating apparatus for practice of the method of the invention;

FIG. 2 is a schematic view illustrating said apparatus during loading of a cylindrical film holder and tree wrapping tube;

FIG. 3 is a plan view of said apparatus as generally seen from line 3—3 in FIG. 2; and FIG. 4 is a section view of a film holding and wrapping tube during a tree wrapping operation.

Referring now to the drawing, numeral 6 identifies an open end cylindrical film holder and wrapping tube which includes a tubular sleeve or cylindrical member 8 affixed at one end to a mounting ring 10. The diameter of the tube is about twelve inches to fifteen inches, although other sizes may be utilized if required. The latter is attached to supporting legs 12 which serve as a stand to maintain the sleeve member in horizontal position. Track means 14 may be provided to guidingly support the wrapping tube 6 for lateral movement, as illustrated in FIG. 3.

An open-end funnel means 16 is supported upon a stand 18 at about mid-length of the track means 14, the smaller end of the funnel being positioned toward a wrapping tube and spaced from the end thereof when the tube is positioned in axial alignment therewith. The smaller end of the funnel is advantageously somewhat less than the diameter of the wrapping tube. The function of the funnel is to fold or compress the branches of a tree in preparation for a film wrapping operation, as will be more apparent hereinafter. The tree may be sprinkled with water before or while passing through the funnel.

A pair of wrapping tube dispensing roll holders 20 is arranged in spaced relation, one on each side of the funnel 16. Each holder includes a stand 22 whereby a roll of polyethylene tube stock 24 is supported for placing a supply of the material upon a wrapping tube 8. While air pervious material may be advantageously used, the inventive concept does not discount the use of any plastic film material having venting holes formed therein. A four foot length tube will hold approximately two hundred feet of tube stock.

The apparatus, including the tracks 14, wrapping tubes 6, funnel 16 and roll holders 20, may be mounted in indicated positions upon a platform 26, so that the apparatus may be conveniently positioned at the scene of tree cutting operations. In such manner, trees may be wrapped soon after cutting, whereby they will be maintained in a better state of preservation during subsequent handling and/or storage.

The operation of the above disclosed apparatus is as follows. Assume that a wrapping tube 6, having a supply of tube stock 28 thereon, is in aligned position with the funnel 16, as shown in FIGS. 1 and 3. A tree 30 is pushed into the funnel so that a trunk end 32 projects from the small end, and the tube stock is tied to the trunk of the tree. The tree is then pushed, or pulled as by a rope means (not shown), through the wrapping tube 8. Such tree movement will, (a) cause a folding of the tree branches toward the tree trunk, and (b) draw tube stock into the wrapping tube sleeve 8 so that it will automatically encircle or enclose the folded tree. As soon as the top end of the tree is within the open end of the sleeve 8, a second tree is forced from the funnel into the sleeve. As the first tree and the trunk of the second tree are moved clear of the sleeve 8, the tube stock is tied just above the top of the first tree, and is also tied about the trunk of the second tree, following which the tube stock is severed between the tied portions, as illustrated in FIG. 1.

It will be seen that such operational steps will allow a rapid and efficient wrapping of trees in sequential order, and that such wrapping can continue until all of the tube stock on one wrapping sleeve 8 is utilized. After the tube stock from one wrapping sleeve is thus exhausted, the empty wrapping sleeve is moved toward its associated loading station where a new supply tube stock is placed thereupon. During such reloading of a wrapping sleeve, the second wrapping sleeve is moved into operative position with the funnel so that tree wrapping can continue.

Certain variations can be made in the wrapping operation above described. For example, as soon as a first tree is entirely moved into the wrapping sleeve, the tube stock can be severed, and a tie made at the top end of the tree in the sleeve, following which a tie can be made with the material about the trunk of the tree projecting from the funnel. Under certain conditions, such a variation in the method may be more desirable than the wrapping method above described.

It will be seen that the apparatus and method above described will satisfy all of the objectives set forth at the beginning of this specification. It will be further noted that while packaging of Christmas trees has been more or less specifically referred to, the method and apparatus may be advantageously utilized with the packaging of any type tree, and will be found extremely useful in tree nursery operations.

The foregoing description has been given in detail without thought of limitation since the inventive principles involved are capable of assuming other forms without departing from the spirit of the invention or the scope of the following claims.

What is claimed is:

1. A method for packaging a tree comprising the steps of arranging a funnel means in fixed position, arranging a pair of tubular elements for selective movement into axial alignment with the funnel means, placing a supply of tubular film material upon the exterior surface of each tubular element, moving one of the tubular elements in substantial axial alignment with the funnel means, forcing a tree through the funnel means so that the branches are folded against the trunk of the tree, moving the folded tree through a tubular element which has been placed in substantial axial alignment with the funnel means, enclosing the tree within the tubular film material taken from the tubular element, and tying both ends of the tubular film so that the tree is enclosed therein.

2. Apparatus for packaging a tree comprising in combination, a funnel means, and an open-ended tubular element positionable in substantial axial alignment with and spaced from the funnel means, said tubular element being adapted to receive a supply of tubular film material sufficient to package a plurality of trees upon its outer surface which film material may be continuously drawn off the tubular element and into the wrapping sleeve for the purpose of enclosing a plurality of trees being passed through the tubular element after leaving the funnel means.

3. Apparatus for packaging a tree comprising in combination, a funnel means, an open-ended tubular element, and support means to support the tubular element in substantial axial alignment with the funnel means, said support means being positioned at the end of the tubular element furthest removed from the funnel element.

4. Apparatus for packaging a tree comprising in combination, a funnel means, an open-ended cylindrical element, and support means to support the cylindrical element in substantial axial alignment with the funnel means, said support means being positioned at the end of the cylindrical element furthest removed from the funnel element, said cylindrical element being adapted to receive a tubular film of material upon its outer surface which material is substantially longer than the tubular element, said material being arranged for drawing off of the cylindrical element at the end of the cylindrical element nearest the funnel means.

5. Apparatus for packaging a tree comprising in combination, a funnel means suported in fixed position, a pair of cylindrical elements, support means to support each cylindrical element in substantial axial alignment with the funnel means, said support means being arranged at the end of each cylindrical element furthest removed from the funnel means, means to guidingly direct each cylindrical element toward and away from the funnel means, and tubular film loading means for placing tubular film upon each cylindrical element.

6. A method for packaging a tree comprising the steps of placing a supply of tubular film sufficient to package a plurality of trees about a tubular element; forcing a tree with base end first through a funnel whereby the branches are folded against the trunk of said tree; tying one end of said supply of tubular film to the base end of the said tree forced through said funnel; passing the folded tree with said tubular film tied thereto through said tubular element, said tubular film being turned inside out and said tree being enclosed therein while passing through said tubular element; and tying the tubular film above the tip of the tree.

7. The method of claim 6 further including the steps of tying said tubular film to the base of a succeeding tree forced through said funnel, severing said tubular film between said ties, removing said first tree from said tubular element, passing said succeeding tree into said tubular element, and repeating said steps until the supply of tubular film on said tubular element is exhausted.

8. A method for packaging a tree comprising the steps of placing a supply of tubular film sufficient to package a plurality of trees about a tubular element; forcing trees with their base ends first through a funnel whereby the branches are folded against the trunks of said trees; tying one end of said supply of tubular film to the base end of the first tree forced through said funnel; passing the first folded tree with said tubular film tied thereto through said tubular element, said tubular film being turned inside out and said tree being enclosed therein while passing through said tubular element; tying the tubular film above the tip of the tree, severing said tubular element above said tie, removing said first tree from said tubular element, tying the severed end of said tubular film to the base of a succeeding tree forced through said funnel, and repeating said steps until the supply of tubular film on said tubular element is exhausted.

9. A method for packaging a tree comprising the steps of placing a supply of tubular film sufficient to package a plurality of trees about a tubular element; forcing a tree with base end first through a funnel whereby the branches are folded against the trunk of said tree; tying one end of said supply of tubular film to the base end of the first tree forced through said funnel; passing the folded tree with said tubular film tied thereto into said tubular element, said tubular film being turned inside out and said tree being enclosed therein while passing through said tubular element; forcing a second tree with base end first through said funnel to fold its branches against its trunk as soon as the top end of said first tree is within said tubular element; passing said first and second trees through said tubular element; tying the tubular film above the top of said first tree and about the base of said second tree as said first tree and the base of said second tree are moved clear of said tubular element; and severing said tubular film between said trees.

10. The method of claim 9 further including the step of forcing subsequent trees through said funnel and into said tubular element to enclose each of said trees in said tubular film in the described manner until the supply of tubular film placed about said tubular element is exhausted.

References Cited
UNITED STATES PATENTS 2,847,805   8/1958   Robbins _____ 53—24

WILLIAM W. DYER, JR., *Primary Examiner.*

FRANK E. BAILEY, TRAVIS S. McGEHEE,
*Examiners.*

R. L. FARRIS, *Assistant Examiner.*